Patented May 20, 1941

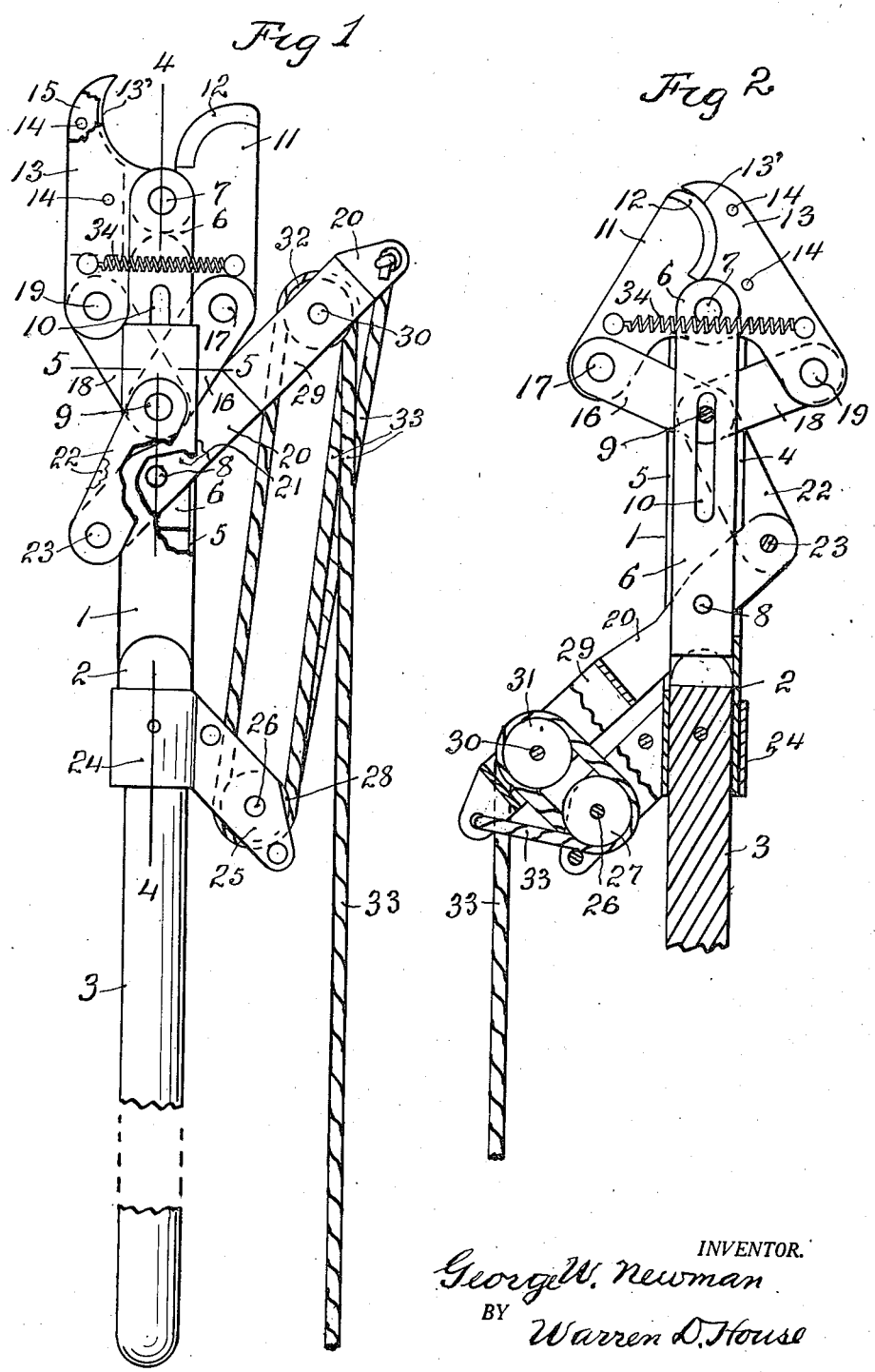

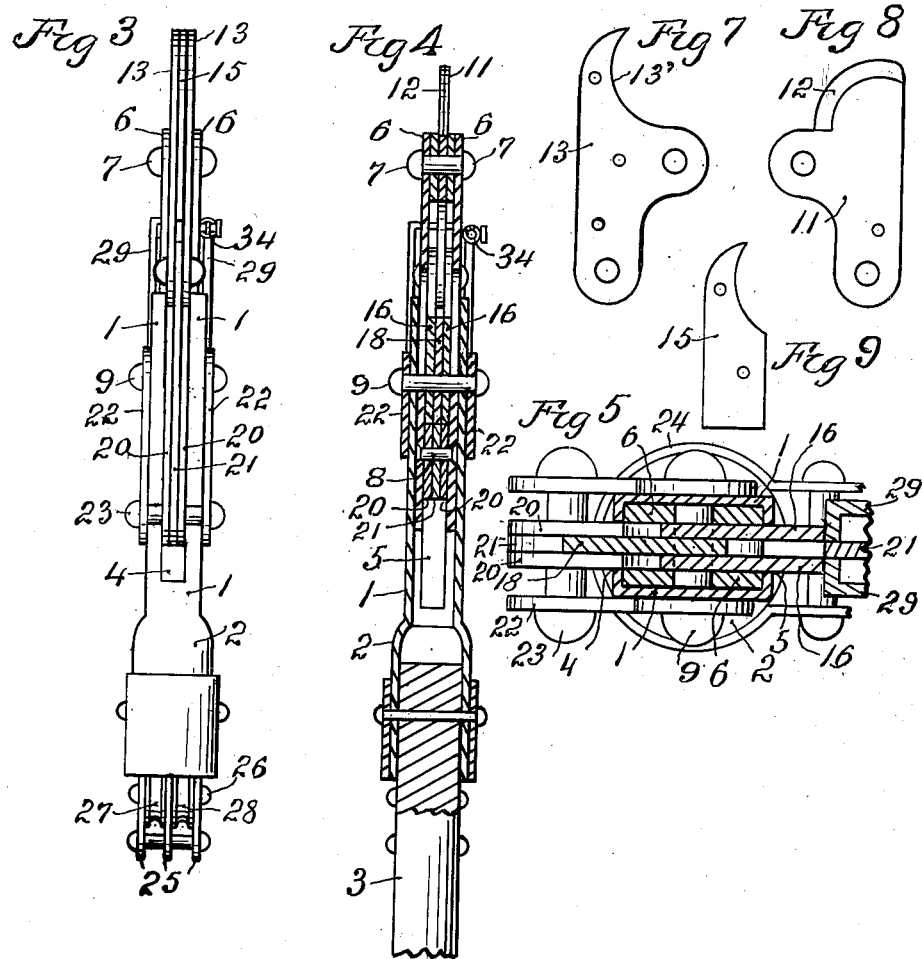

2,242,476

UNITED STATES PATENT OFFICE 2,242,476

PRUNING IMPLEMENT

George W. Newman, Kansas City, Mo.

Application March 18, 1940, Serial No. 324,589

10 Claims. (Cl. 30—245)

My invention relates to improvements in pruning implements.

My invention relates to the type of pruning implements having two shearing jaws pivoted to each other and connected by a toggle, and having a pivoted lever combined with means actuated by the lever for operatively swinging the jaws in the shearing operation.

One of the objects of my invention is the provision of a novel implement of the kind described which is simple, strong, durable, not likely to get out of order, and with which relatively thick branches or roots may be easily severed.

The novel features of my invention are hereinafter fully described and claimed.

In the accompanying drawings, which illustrate the preferred embodiment of my invention, Fig. 1 is a side elevation of my improved pruning implement, partly broken away, and showing the parts as positioned when the shearing jaws are in the open position.

Fig. 2 is a side view of the implement opposite to the side shown in Fig. 1, partly broken away, partly in elevation, partly in longitudinal section and with the jaws closed.

Fig. 3 is an edge elevation of the implement with the handle removed.

Fig. 4 is a section on the line 4—4 of Fig. 1.

Fig. 5 is an enlarged section on the line 5—5 of Fig. 1.

Fig. 6 is a top end view of the implement with the cable removed.

Fig. 7 is a side elevation of one of the jaws, broken away.

Fig. 8 is a side of the other jaw having the cutting edge.

Fig. 9 is a side elevation of the spacing plate forming part of the jaw shown in Fig. 7.

Similar characters of reference designate similar parts in the different views.

My improved pruning implement is provided with a support comprising a longitudinal tubular member 1, having a socket portion 2, and a handle 3 fastened at one end in the socket portion 2.

The remainder of the member 1 is rectangular in cross section, its opposite edges having respectively longitudinal slots 4 and 5, extending longitudinally from near the socket portion 2 to the other end of the member 1.

A reciprocative member comprising two parallel longitudinal plates 6 are longitudinally slidable in the rectangular portion of the member 1, their upper ends being fastened together by a bolt 7, and their lower ends fastened together by a rivet 8, Fig. 4.

A transverse bolt 9 extends through two longitudinal slots 10 respectively provided in the plates 6 of the reciprocative member. This bolt 9 also extends through and is fixed in the flat parallel sides of the member 1, Figs. 2 and 4.

A shearing jaw 11 is pivoted on the bolt 7 between the plates 6 of the reciprocative member. Its upper end has a convexly arcuate cutting edge 12. The jaw 11 is disposed between two parallel similarly formed plates 13 also pivoted on the bolt 7 and having fastened between them by rivets 14 a spacing plate 15, Figs. 1, 2, 7, 8 and 9. The plates 13 have respectively concavely arcuate inner edges 13' for receiving between them the cutting edge 12 of the cooperating shearing jaw 11, and to have borne against them the root or branch to be sheared.

A toggle connects the lower ends of the shearing jaws, and, as shown in Figs. 1, 2, 4 and 5, comprises two parallel plates 16 pivoted by a rivet 17 to the lower end of the shearing jaw 11 at opposite sides thereof, and a third plate 18 pivoted to and between the jaw plates 13 by a rivet 19. The lower ends of the toggle plates are pivoted on the fixed bolt 9.

For swinging the shearing jaws from the open position shown in Fig. 1 to the closed position shown in Fig. 2, the following described means are employed.

A lever, comprising two plates 20 are fastened flatwise to opposite sides of a straight flat middle plate 21, is pivoted on the rivet 8, which is fastened to the lower end portions of the plates 6 of the reciprocative member, said lever extending through the edge slots 4 and 5 of the member 1 of the support.

Leverage amplifying means connect the lower end portions of the plates 20 and 21 of the lever with the supporting member 1. Such means consists of two parallel plates 22 having their upper ends pivoted to the fixed bolt 9 at the outer sides respectively of the supporting member 1, their lower ends being pivoted by a rivet 23 to the lever at the outer sides of the plates 20 thereof, at a point at one side of the axis, the rivet 8, of the lever.

By swinging downwardly the upper end of the lever 20, from the position, shown in Fig. 1, to the position shown in Fig. 2, the lever, through the rivet 8, will draw down the plates 6 of the reciprocative member, thus closing the jaws 11 and 13, and causing them to shear a root or branch inserted between them. The toggle connecting the jaws will amplify the leverage as the jaws close. Further leverage amplification of the leverage will be exerted by the pivotal connection of the lever with the support 1.

For swinging the lever 20 to close the jaws 11 and 13, and for further amplifying the leverage exerted by the lever in so doing, a block and tackle means is employed comprising the following described parts.

A bracket has an upper portion 24 embracing the socket portion 2 of the support. It is provided with three downwardly extending lateral arms 25, spaced apart and having extending transversely through them a bolt 26 on which are rotatable two pulleys 27 and 28 disposed at opposite sides respectively of the middle arm 25.

The upper portions of the lever plates 20, as viewed in Figs. 1 and 6 are bent outwardly into two inwardly facing U shaped portions 29 through which extends transversely, and through the middle plate 21 of the lever, a bolt 30 on which are rotatable at opposite sides of the middle plate 21 two pulleys 31 and 32.

A cable 33 is fastened to the end of the lever 20 opposite to that through which extends the rivet 23. The cable extends from the lever 20 to and around the pulley 27, thence over the pulley 31, thence over the pulley 28, and thence upwardly to the pulley 32 and from there downwardly parallel with the handle 3.

By pulling downwardly on the cable 33 at its free end, the lever will be swung downwardly, as viewed in Fig. 1, and the jaws will be swung to the closed position, shown in Fig. 2, as has been described.

For retracting the jaws from the closed to the open position, yielding resilient means, comprising a transverse coil spring 34 is provided, the ends of the spring being respectively fastened to the jaws 11 and 13 below the bolt 7, as shown in Figs. 1, 2, 3, 4 and 6, the tension of the spring being such as to effect this function.

The spacing plate 15 does not extend to the arcuate edges 13' of the jaw plates 13, thus permitting the cutting edge 12 of the jaw 11 to freely enter between said jaw plates.

Many modifications of my invention, within the scope of the appended claims, may be made without departing from the spirit of my invention.

What I claim is:

1. In a pruning implement, two members, one a support and the other reciprocative thereon, two cooperating shearing jaws pivoted to each other and to one of said members, so as to oscillate to and from the closed position, a toggle connecting said jaws and pivoted at its axis to the other of said two members, a lever pivoted to said member to which said jaws are pivoted, a link pivoted to said lever at one side of the axis of the lever and pivoted to said member to which said toggle is pivoted, and a block and tackle means connecting said lever and said support for amplifying the leverage exerted by said lever.

2. In a pruning implement, a support, a member reciprocative thereon, two cooperating shearing jaws pivoted to each other and to said reciprocative member so as to oscillate to and from the closed position, a toggle connecting said jaws and pivoted at its axis to said support, a lever pivoted to said reciprocative member, a link pivoted to said lever at one side of the axis of the latter and pivoted to said support, and a block and tackle means connecting said lever with said support for amplifying the leverage exerted by said lever.

3. In a pruning implement, two members, one a support and the other reciprocative thereon, two cooperating shearing jaws pivoted to each other and to one of said members, so as to oscillate to and from the closed position, a toggle connecting said jaws and pivoted at its axis to the other of said two members, a lever pivoted to said member to which said jaws are pivoted, means connecting said lever and said member to which said toggle is pivoted for amplifying the leverage exerted by said lever, and a block and tackle means connecting said lever with said support for further amplifying the leverage exerted by said lever.

4. In a pruning implement, a support, a member reciprocative thereon, two cooperating shearing jaws pivoted to each other and to said reciprocative member so as to oscillate to and from the closed position, a toggle connecting said jaws and pivoted at its axis to said support, a lever pivoted to said reciprocative member, and means connecting said lever to said support for amplifying the leverage exerted by said lever against said reciprocating member.

5. In a pruning implement, a support, a member reciprocative thereon, two cooperating shearing jaws pivoted to each other and to said reciprocating member so as to oscillate to and from the closed position, a toggle connecting said jaws and pivoted at its axis to said support, a lever pivoted to said reciprocative member, means for swinging said lever, and a link pivoted to said support, and pivoted to said lever at a point nearer to the axis of said lever than the point at which said swinging means engages said lever.

6. In a pruning implement, two members, one a support and the other reciprocative thereon, two cooperating shearing jaws pivoted to each other and to one of said members so as to oscillate to and from the closed position, a toggle connecting said jaws and pivoted at its axis to the other of said two members, a lever pivoted to said member to which said jaws are pivoted, means connecting said lever with one of said two members by which, when said lever is swung in one direction, said jaws will be swung to the closed position, and yielding means for swinging said jaws to the open position.

7. In a pruning implement, a support, a member reciprocative thereon, two cooperating shearing jaws pivoted to each other and to said reciprocative member to oscillate to and from the closed position, a toggle connecting said jaws and pivoted at its axis to said support, a lever pivoted to said reciprocative member, means connecting said lever to said support by which, when said lever is swung in one direction, said reciprocating will be moved to close said jaws, and yielding means for swinging said jaws to the open position.

8. In a pruning implement, a support, a member reciprocative thereon, two cooperating shearing jaws pivoted to each other and to said reciprocative member to oscillate to and from the closed position, a toggle connecting said jaws and pivoted at its axis to said support, a lever pivoted to said reciprocating member, means by which when said lever is swung in one direction it will move said reciprocating member to swing said jaws to the closed position, a block and tackle means connecting said lever with said support by which said lever may be swung in said direction, and yielding means for swinging said jaws to the open position.

9. In a pruning implement, two members, one a support and the other a reciprocating member thereon, two cooperating shearing jaws pivoted to each other and to one of said members, a toggle connecting said jaws and pivoted at its axis to the other of said two members, a lever pivoted to said member to which said jaws are pivoted, means connecting said lever to said member to which said toggle is pivoted by which when said lever is swung in one direction, said jaws will be swung to the closed position, a block and tackle means connected to said lever for swinging said lever in said direction, and yielding means for swinging said jaws to the open position.

10. In a pruning implement, a support, a member reciprocative thereon, two cooperating shearing jaws pivoted to each other and to said reciprocative member to swing to and from the closed position, a toggle connecting said jaws and pivoted at their axis to said support, a lever pivoted to said reciprocative member, a link pivoted to said support and pivoted to said lever at one side of the axis of said lever by which, when said lever is swung in one direction said lever will move said jaws to close said jaws, a block and tackle means connected to said lever for swinging said lever in said direction, and resilient means for swinging said jaws to the open position.

GEORGE W. NEWMAN.